United States Patent
Chen et al.

(10) Patent No.: US 8,446,135 B2
(45) Date of Patent: May 21, 2013

(54) CONTROL CIRCUIT AND METHOD FOR A RIPPLE REGULATOR SYSTEM

(75) Inventors: An-Tung Chen, Taoyuan County (TW); Chih-Hao Yang, Tainan (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 0 days.

(21) Appl. No.: 13/404,520

(22) Filed: Feb. 24, 2012

(65) Prior Publication Data

US 2012/0217941 A1 Aug. 30, 2012

(30) Foreign Application Priority Data

Feb. 24, 2011 (TW) .............................. 100106258 A

(51) Int. Cl.
*G05F 1/56* (2006.01)
(52) U.S. Cl.
USPC ......................................... 323/271; 323/288
(58) Field of Classification Search
USPC .................. 323/271, 282, 283, 288
See application file for complete search history.

(56) References Cited

U.S. PATENT DOCUMENTS

| | | | |
|---|---|---|---|
| 4,161,771 A * | 7/1979 | Bates | 363/43 |
| 6,271,650 B1 * | 8/2001 | Massie et al. | 323/272 |
| 6,583,610 B2 * | 6/2003 | Groom et al. | 323/288 |
| 6,791,306 B2 * | 9/2004 | Walters et al. | 323/288 |
| 6,922,044 B2 * | 7/2005 | Walters et al. | 323/288 |
| 7,019,502 B2 * | 3/2006 | Walters et al. | 323/282 |
| 7,132,820 B2 * | 11/2006 | Walters et al. | 323/288 |
| 7,482,793 B2 * | 1/2009 | Stoichita | 323/282 |
| 8,085,011 B1 * | 12/2011 | Petricek | 323/259 |
| 8,129,972 B2 * | 3/2012 | Audy | 323/285 |
| 8,154,268 B2 * | 4/2012 | Philbrick et al. | 323/286 |
| RE43,414 E * | 5/2012 | Walters et al. | 323/288 |
| 2009/0174380 A1 * | 7/2009 | Wu et al. | 323/282 |
| 2010/0270995 A1 * | 10/2010 | Laur et al. | 323/285 |
| 2011/0234193 A1 * | 9/2011 | Laur et al. | 323/311 |
| 2011/0260703 A1 * | 10/2011 | Laur et al. | 323/271 |
| 2012/0112721 A1 * | 5/2012 | Wu et al. | 323/288 |

\* cited by examiner

*Primary Examiner* — Adolf Berhane
(74) *Attorney, Agent, or Firm* — Muncy, Geissler, Olds & Lowe, PLLC

(57) ABSTRACT

A control circuit and method for a ripple regulator system generate a ripple signal in-phase and synchronous with an inductor current of the ripple regulator system, and extract a ripple information proportional to the amplitude of the ripple signal. The ripple signal is used for triggering control in PWM signal generation to make the ripple regulator system have small ripples and better loop stability simultaneously. The ripple information is used to improve the output offset of the ripple regulator system that is caused by the ripple signal.

7 Claims, 6 Drawing Sheets

CONTROL CIRCUIT AND METHOD FOR A RIPPLE REGULATOR SYSTEM

FIELD OF THE INVENTION

The present invention is related generally to a ripple regulator system and, more particularly, to a control circuit and method for a ripple regulator system.

BACKGROUND OF THE INVENTION

In a constant on time (COT) or hysteretic mode self-clocking DC-to-DC power converter system, generation of the pulse width modulation (PWM) signal relies on ripples of the output voltage to carry out triggering control. Large ripples are beneficial to loop stability; however, they may result in over specification conditions. On the contrary, small ripples could remain the system under specifications, while they are adverse to loop stability. Thus, it is a challenge to maintain loop stability with small output voltage ripples for design of the power converter system.

As shown in FIG. 1, a traditional COT ripple regulator system includes a high-side device Q1 and a low-side device Q2 connected to each other by a phase node Phs in series between a voltage input terminal Vin and a ground GND, a control circuit 10 to provide PWM signals UG and LG for controlling the high-side device Q1 and the low-side device Q2, respectively, to regulate an inductor current IL to charge an output capacitor Co to generate an output voltage Vout, and voltage divider resistors R1 and R2 divide the output voltage Vout to generate a feedback voltage Vfb1 for the control circuit 10. In FIG. 1, the resistor R3 represents the effective series resistance (ESR) of the output capacitor Co. In the control circuit 10, an error comparator 14 compares the feedback voltage Vfb1 with a reference voltage Vref to generate a comparison signal Sc, a PWM controller 12 triggers the PWM signal UG responsive to the comparison signal Sc, to control the high-side device Q1, and an inverter 16 inverts the PWM signal UG to generate the PWM signal LG for controlling the low-side device Q2. In the PWM controller 12, a constant time generator 18 determines the constant time Ton of the PWM signal UG, and a logic controller 22 generates a triggering signal St responsive to the comparison signal Sc for a one shot circuit 20 to trigger the PWM signal UG.

FIG. 2 is a waveform diagram of the circuit shown in FIG. 1 to illustrate operation of the COT ripple regulator system. Referring to FIGS. 1 and 2, at time t1, the feedback voltage Vfb1 becomes lower than the reference voltage Vref, so the comparison signal Sc turns to low from high and as a result, the logic controller 22 asserts the triggering signal St to trigger the PWM signal UG, to turn on the high-side device Q1 for a time period, i.e. the constant time Ton. During the high-side device Q1 is on, the feedback voltage Vfb1 increases, and then upon expiration of the constant time Ton, the high-side device Q1 is turned off and the low-side device Q2 is turned on, by which the feedback voltage Vfb1 decreases. When the feedback voltage Vfb1 again becomes lower than the reference voltage Vref, the high-side device Q1 is turned on again for the constant time Ton. By working with such a cycle, the COT ripple regulator system regulates the output voltage Vout at a default value.

However, in the case that a ceramic capacitor is used as the output capacitor Co, due to the very small effective series resistance R3 of the ceramic capacitor, the output voltage Vout and thereby the feedback voltage Vfb1 will have very small ripples, even could be regarded as DC signals, causing the COT ripple regulator system almost impossible to operate stably.

SUMMARY OF THE INVENTION

An objective of the present invention is to provide a control circuit and method for a ripple regulator system to have small ripples and high loop stability simultaneously.

Another objective of the present invention is to provide a control circuit and method for improving the output offset of a ripple regulator system.

According to the present invention, a control circuit for a ripple regulator system includes an error comparator to compare a reference voltage with a feedback voltage related to the output voltage of the ripple regulator system to generate a comparison signal, a PWM controller to trigger a PWM signal responsive to the comparison signal to control an inductor current, a ripple generation circuit to provide a ripple signal in-phase and synchronous with the inductor current to be superposed to the reference voltage or the feedback voltage for improving the loop stability, and an offset cancellation circuit to extract a ripple information proportional to the amplitude of the ripple signal from the ripple generation circuit, to generate an offset cancellation signal for the error comparator to improve the offset of the output voltage caused by the ripple signal.

According to the present invention, a control method for a ripple regulator system includes comparing a reference voltage with a feedback voltage related to the output voltage of the ripple regulator system to generate a comparison signal for triggering a PWM signal to control an inductor current, generating a ripple signal in-phase and synchronous with the inductor current to be superposed to the feedback voltage or the reference voltage, and extracting a ripple information proportional to the amplitude of the ripple signal to generate an offset cancellation signal for improving the offset of the output voltage caused by the ripple signal.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
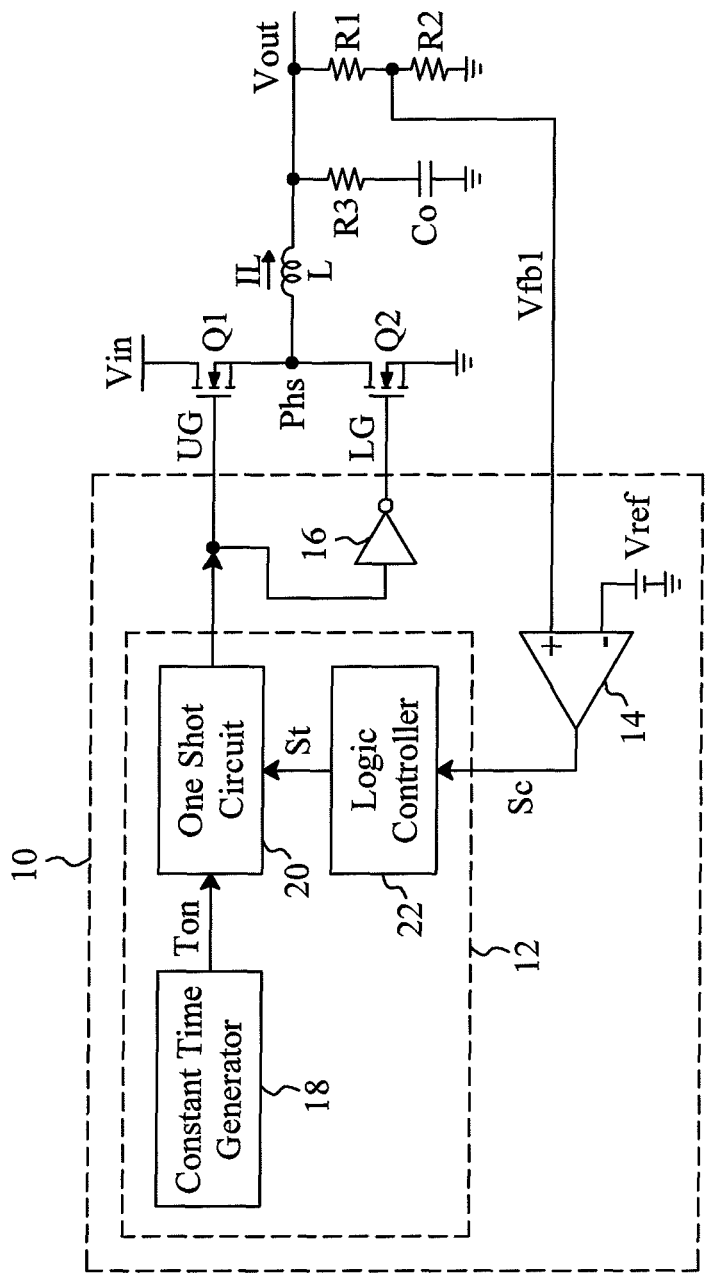
FIG. 1 is a circuit diagram of a traditional COT ripple regulator system.
Figure 2:
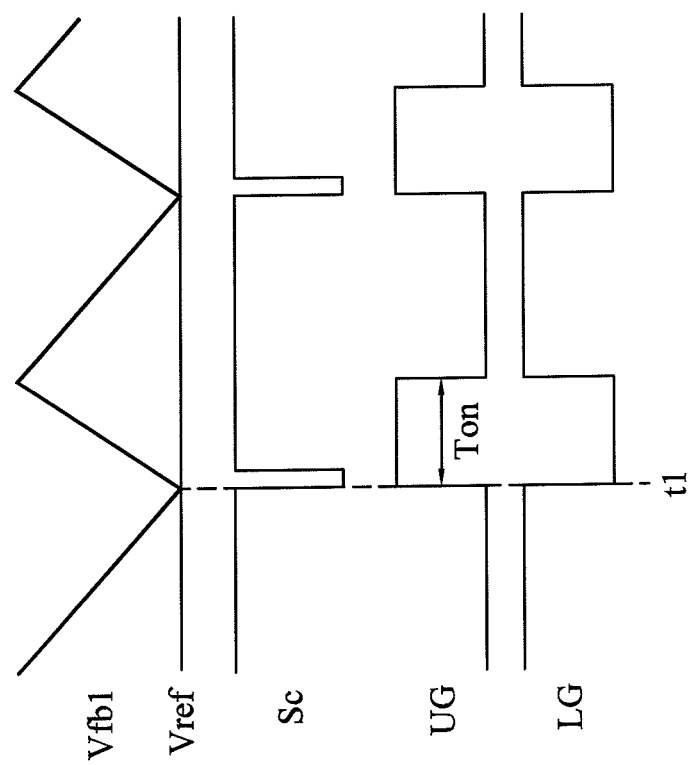
FIG. 2 is a waveform diagram of the circuit shown in FIG. 1.
Figure 3:
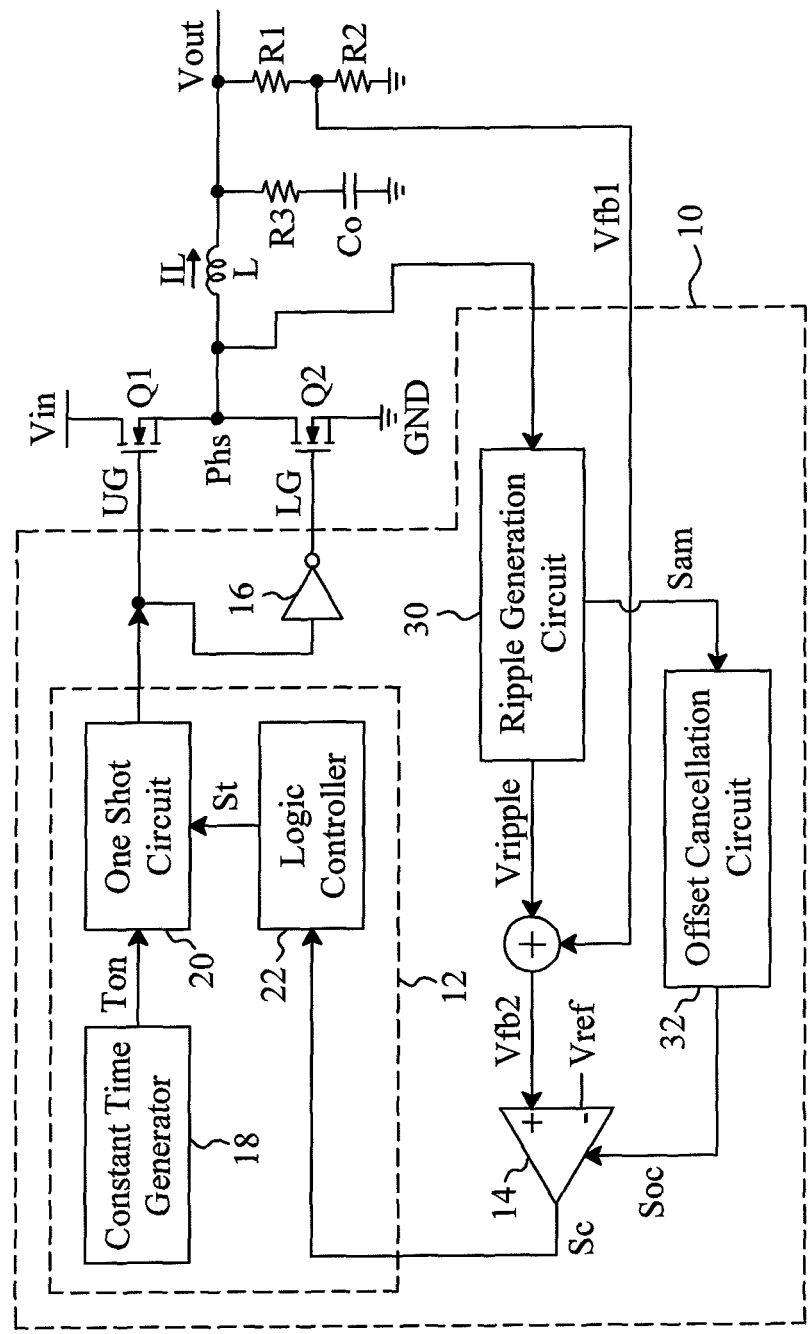
FIG. 3 is a circuit diagram of an embodiment according to the present invention.
Figure 4:
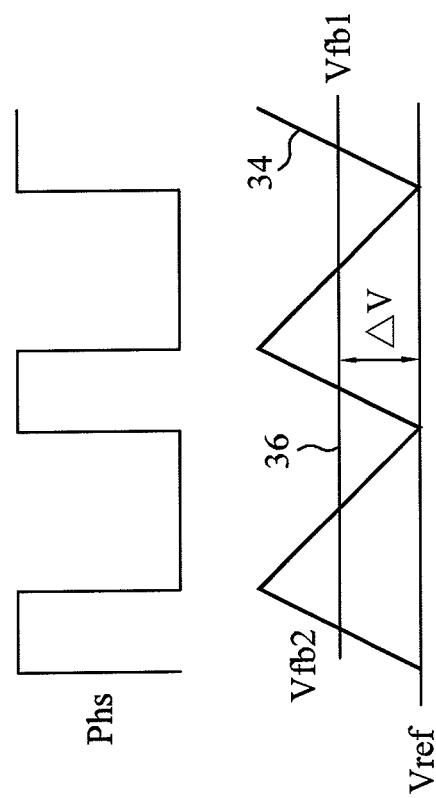
FIG. 4 is a waveform diagram of the circuit shown in FIG. 3.

FIG. 3 is a circuit diagram of an embodiment according to the present invention based on the circuit shown in FIG. 1, in which the output capacitor Co has a very small effective series resistance R3 and thus makes the feedback voltage Vfb1 have small ripples that can be regarded as a DC signal, as shown by the waveform 36 in FIG. 4. In addition to the PWM controller 12, error comparator 14 and inverter 16 as those shown in FIG. 1, the control circuit 10 shown in FIG. 3 further includes a ripple generation circuit 30 and an offset cancellation circuit 32. According to the voltage at the phase node Phs, the ripple generation circuit 30 generates a ripple signal Vripple in-phase and synchronous with the inductor current IL for a positive input terminal of the error comparator 14. In particular, the ripple signal Vripple is superposed to the feedback voltage Vfb1 to generate a feedback voltage Vfb2 having large ripples, as shown by the waveform 34 in FIG. 4, thereby preventing the loop instability that might otherwise be caused by the small effective series resistance R3. In other embodiments, the ripple signal Vripple may be superposed to the reference voltage Vref at the negative input terminal of the error comparator 14 instead. The COT ripple regulator system shown in FIG. 3 uses the feedback voltage Vfb2 to trigger the PWM signal UG, so when the loop is steady, as shown by the waveform 36 in FIG. 4, the feedback voltage Vfb1 is not equal to the reference voltage Vref, but has a difference $\Delta V$ from Vref, where $\Delta V$ is equal to the amplitude of the ripple signal Vripple. This will cause an offset of the output voltage Vout departing from the default value, and this offset may be over specifications for systems requiring higher preciseness. In the circuit shown in FIG. 3, the offset cancellation circuit 32 generates an offset cancellation signal Soc according to a ripple information Sam of the ripple signal Vripple extracted from the ripple generation circuit 30, for the error comparator 14 to improve the offset of the output voltage Vout caused by the ripple signal Vripple. The ripple information Sam is proportional to the amplitude $\Delta V$ of the ripple signal Vripple. The offset cancellation signal Soc may be provided to the positive or negative input terminal of the error comparator 14 to shift the feedback voltage Vfb2 or the reference voltage Vref, or to adjust an internal offset parameter of the error comparator 14.

Figure 5:
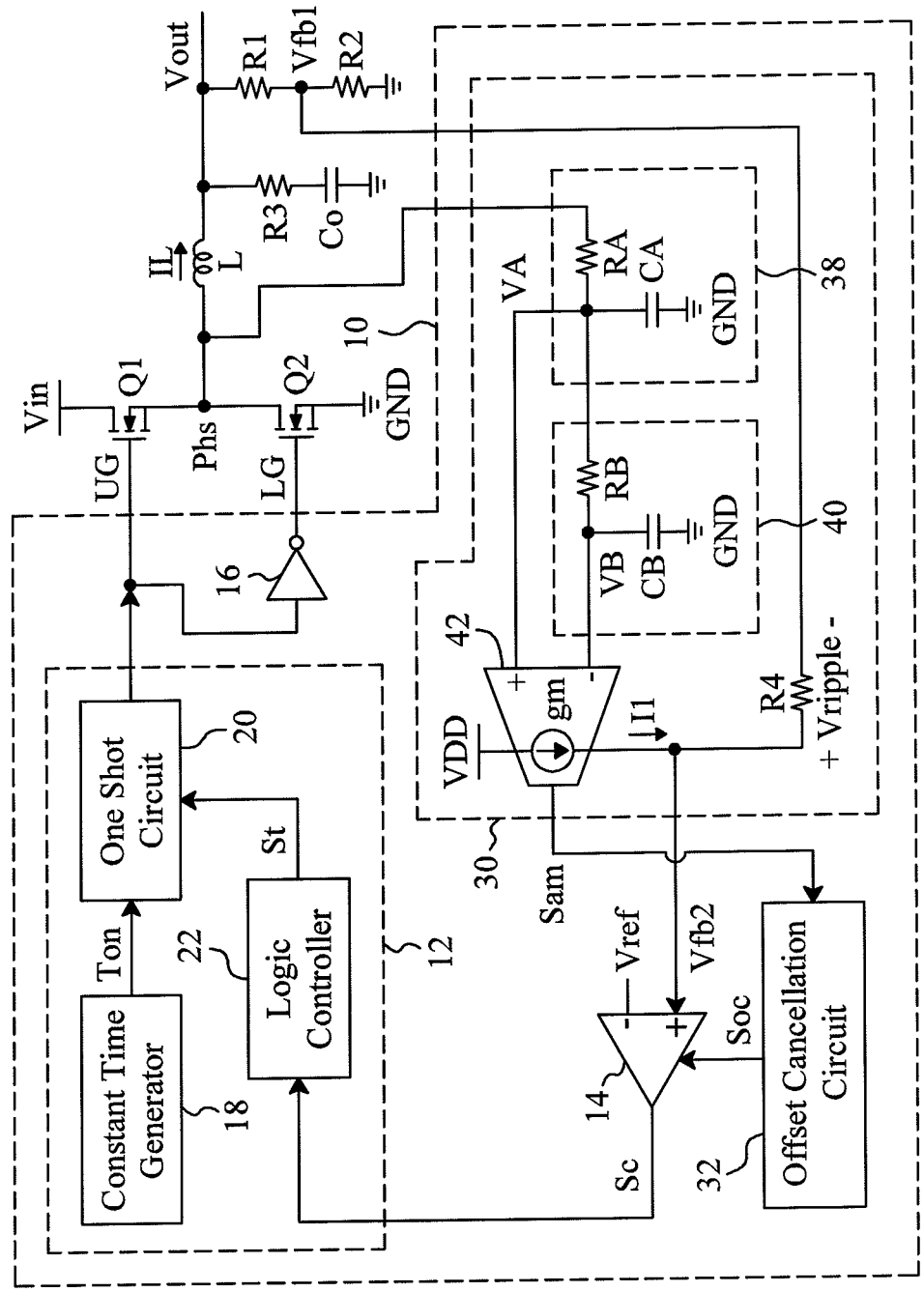
FIG. 5 is a circuit diagram of an embodiment for the ripple generation circuit shown in FIG. 3.

FIG. 5 is a circuit diagram of an embodiment for the ripple generation circuit 30, in which a resistor RA and a capacitor CA establish a low-pass filter 38 to filter off the high-frequency component of the voltage at the phase node Phs to generate a signal VA, a resistor RB and a capacitor CB establish a low-pass filter 40 to filter off an AC component of the signal VA to generate a signal VB, and a transconductance amplifier 42 amplifies the difference between the signals VA and VB to generate a transconductance current $I1=gm\times(VA-VB)$, where gm is the transconductance of the transconductance amplifier 42. When the high-side device Q1 is on and the low-side device Q2 is off, the voltage at the phase node Phs is equal to the input voltage Vin and the capacitor CA is charged by the voltage source Vin through the high-side device Q1 and the resistor RA. When the high-side device Q1 is off and the low-side device Q2 is on, the capacitor CA discharges to ground GND through the resistor RA and the low-side device Q2. Therefore, the signal VA has a triangular-like waveform and is in-phase and synchronous with the inductor current IL, the signal VB is the average of the signal VA, and the transconductance current I1 is in-phase and synchronous with the inductor current IL. A resistor R4 is connected between the error comparator 14 and the node Vfb1, by which the ripple signal Vripple is generated because of the transconductance current I1, and is superposed to the feedback voltage Vfb1 to generate the feedback voltage Vfb2.

Figure 6:
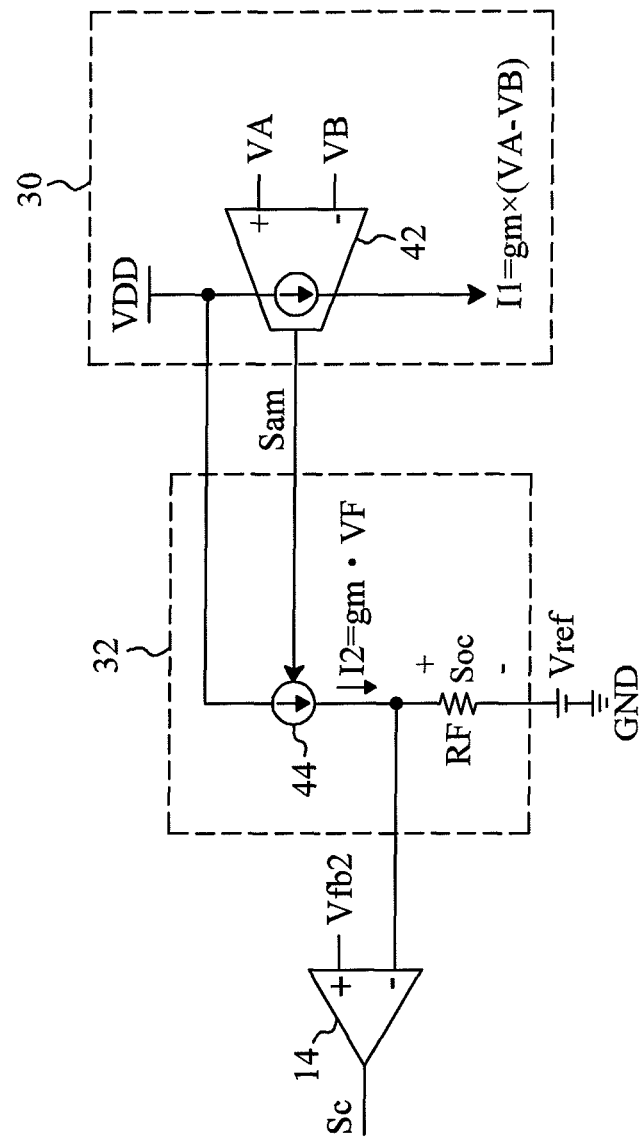
FIG. 6 is a circuit diagram of an embodiment for the offset cancellation circuit shown in FIG. 3.

As shown in FIG. 5, the ripples of the ripple signal Vripple is generated by multiplying the difference between the signals VA and VB by $gm\times R4$. Since R4 is constant, the offset caused by the ripple signal Vripple can be reduced by sending the information about the maximum of $|gm\times(VA-VB)|$ to the offset cancellation circuit 32. FIG. 6 is a circuit diagram of an embodiment for the offset cancellation circuit 32, in which a current source 44 provides an offset current $I2=gm\times VF$ according to the ripple information Sam, where VF is proportional to the maximum of $|VA-VB|$, and a resistor RF is connected between the negative input terminal of the error comparator 14 and the reference voltage terminal Vref, to generate the offset cancellation signal Soc responsive to the offset current I2 to shift the reference voltage Vref, thereby reducing the offset of the output voltage Vout. Referring to FIGS. 4-6, the ripples of the ripple signal Vripple has the magnitude equal to $gm\times R4\times(VA-VB)$, so the offset $\Delta V$ between the feedback voltage Vfb1 and the reference voltage Vref is equal to the maximum of $|0.5\times gm\times R4\times(VA-VB)|$. If the offset cancellation signal $Soc=I2\times RF=\Delta V$, the offset of the output voltage Vout can be fully eliminated.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for a ripple regulator system having a high-side device and a low-side device being coupled to each other by a phase node and controlled by a pulse width modulation (PWM) signal to control an inductor current to charge an output capacitor for generating an output voltage, the control circuit comprising:
   an error comparator having two input terminals to receive a reference voltage and a feedback voltage related to the output voltage, respectively, and an output terminal to provide a comparison signal;
   a PWM controller connected to the error comparator, responsive to the comparison signal to trigger the PWM signal;
   a ripple generation circuit operative to generate a ripple signal in-phase and synchronous with the inductor current for one of the two input terminals of the error comparator; and
   an offset cancellation circuit connected to the ripple generation circuit and the error comparator, operative to extract a ripple information proportional to an amplitude of the ripple signal from the ripple generation circuit, to generate an offset cancellation signal supplied to the error comparator to improve an offset of the output voltage caused by the ripple signal.

2. The control circuit of claim 1, wherein the ripple generation circuit comprises:
   a first low-pass filter connected to the phase node, filtering off a high-frequency component of the voltage at the phase node, to generate a first signal in-phase and synchronous with the inductor current;
   a second low-pass filter connected to the first low-pass filter, filtering off an AC component of the first signal to generate a second signal;
   a transconductance amplifier connected to the first and second low-pass filters, generating a transconductance current in-phase and synchronous with the inductor current according to a difference between the first and second signals; and
   a resistor connected to the transconductance amplifier, generating the ripple signal responsive to the transconductance current.

3. The control circuit of claim 1, wherein the offset cancellation circuit provides the offset cancellation signal to one of the two input terminals of the error comparator to shift the reference voltage or the feedback voltage.

4. The control circuit of claim 1, wherein the offset cancellation circuit provides the offset cancellation signal for the error comparator to adjust an offset parameter of the error comparator.

5. The control circuit of claim 1, wherein the offset cancellation circuit comprises:
   a current source connected to the ripple generation circuit, responsive to the ripple information to provide an offset current proportional to the amplitude of the ripple signal; and
   a resistor connected to the current source, generating the offset cancellation signal responsive to the offset current.

6. A control method for a ripple regulator system having a high-side device and a low-side device being coupled to each other by a phase node and controlled by a pulse width modulation (PWM) signal to control an inductor current to charge an output capacitor for generating an output voltage, the control method comprising steps of:
   A.) comparing a reference voltage with a feedback voltage related to the output voltage to generate a comparison signal for triggering the PWM signal;
   B.) generating a ripple signal in-phase and synchronous with the inductor current to be superposed to one of the feedback voltage and the reference voltage; and
   C.) extracting a ripple information proportional to an amplitude of the ripple signal, to generate an offset cancellation signal to improve an offset of the output voltage caused by the ripple signal.

7. The control method of claim 6, wherein the step B comprises steps of:
   filtering off a high-frequency component of the voltage at the phase node, to generate a first signal in-phase and synchronous with the inductor current;
   filtering off an AC component of the first signal to generate a second signal; and
   generating the ripple signal according to a difference between the first and second signals.

* * * * *